3,188,479
COMBINATION ENGINE STARTER AND ACCESSORY DRIVE MECHANISM
Palmer R. Wood, Scottsdale, and Evart R. Chapman and William W. Spragins, Phoenix, Ariz., assignors to The Garrett Corporation, Los Angeles, Calif., a corporation of California
Filed Nov. 14, 1960, Ser. No. 68,927
10 Claims. (Cl. 290—4)

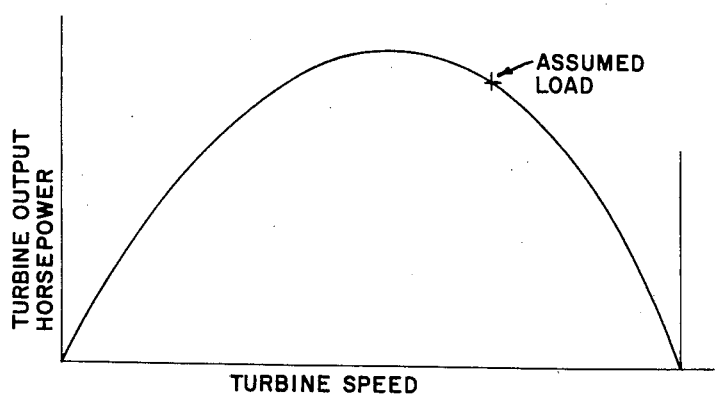
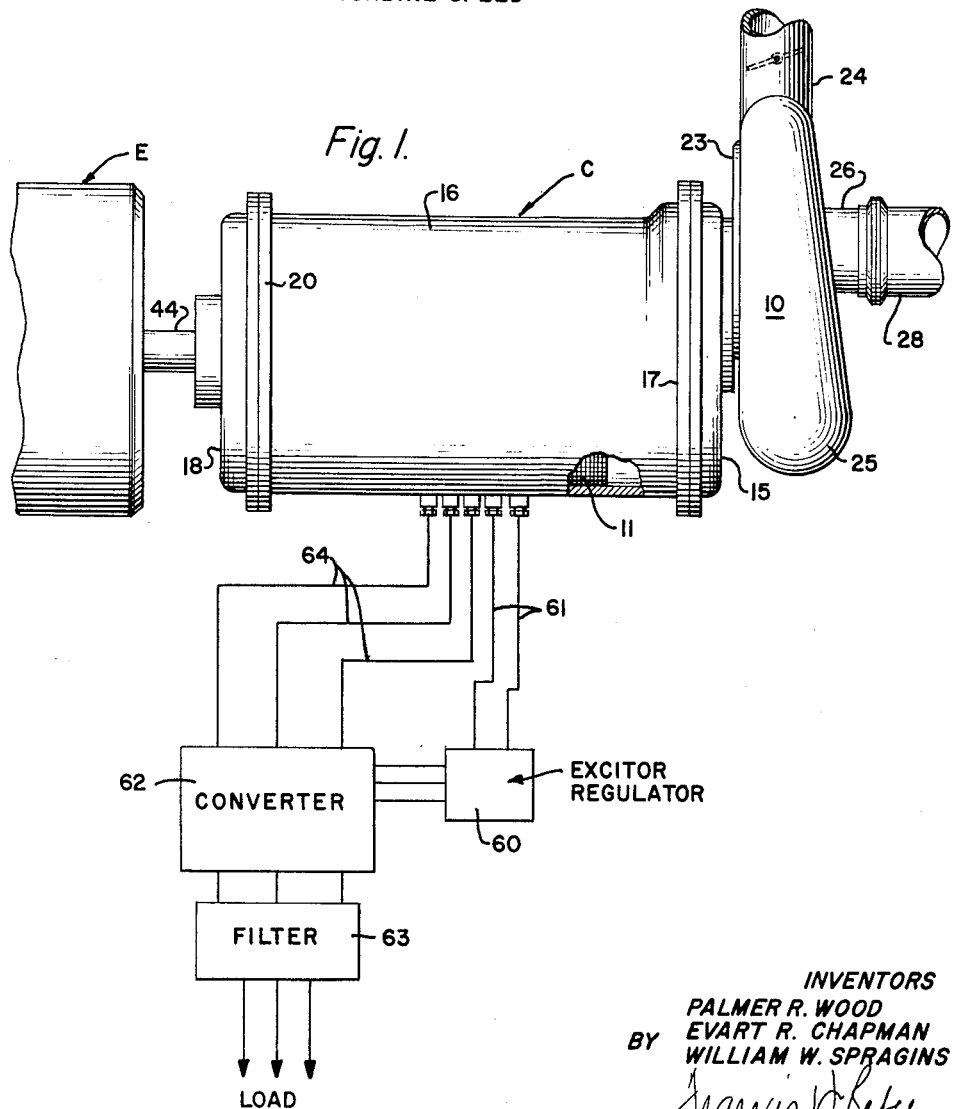

This invention relates generally to gas turbine accessories, and is particularly directed to a new and improved combination engine starter and generator drive which will efficiently convert variable speed shaft input power or the power inherent in a flow of compressor air into essentially constant frequency electrical output power.

In order to obtain electric current at a constant frequency through the use of gas turbine engines, such engines have in the past been provided with differential transmissions which compensate for differences between the speed of engine operation and the required speed of operation of the generators for producing electric current. Such transmissions have been heavy and complicated in construction and thus have been limited in their use.

The concept of high speed, high frequency generation of electric power with conversion to useable frequencies has been effectively practised in locomotive and industrial power applications for some time. However, until recently the weight reduction possible with high speed generators has been largely offset by heavy conversion devices. But now, with static rectifiers available, the conversion of variable, high frequency power to lower constant frequencies can be accomplished with a lightweight assembly having few, if any, moving or wearing parts.

It is an object of this invention to apply the principles of such high speed, variable frequency generation and conversion of electric power to gas turbine engine driven accessories and thereby provide a marked reduction in weight and elimination of parts normally used in prior types of power generation.

Another object of the invention is to combine such variable frequency power generation with the function of starting the gas turbine engine through a suitable transmission mechanism.

Another object of this invention is to provide an improved combination of power generator and engine starter which will produce constant frequency electric power.

Another object is to provide such a combined power generator and engine starter which will furnish the required electric power for preliminary checking of the entire electrical system of a transportation unit in which it is used.

Another object is to provide such a combination starter and power generator which is adaptable to produce emergency electric power in the event of main engine failure.

Still another object of this invention is to provide a combination engine starter and power generator which is adapted to be operated by an air turbine motor with the complete elimination of any speed control mechanism for said motor.

A further object of this invention is to provide a combination engine starter and power generator which includes, as an integral part thereof, an air turbine which is adapted to start a main gas turbine engine and also to operate the power generator during any failure of the main turbine engine.

Another object of this invention is to provide a combined starter and power generator which includes, in combination, an air turbine, suitable gearing, a high speed generator, and a common shaft for driving the generator and for starting the main turbine engine.

Still another object of this invention is to provide a combined starter and power generator which includes an air turbine, suitable gearing, a high speed generator, and the necessary electrical components required to convert the generator high frequency output into the desired electrical system output, such combination of parts being so constructed and arranged that during normal operation generator power is taken directly from the main engine drive pad, and during preliminary checking or emergency operation the entire input to the generator is derived from the air turbine.

The above and other objects and advantages of the invention will be apparent from the following description and the accompanying drawings, in which:

FIG. 1 is a schematic view of the essential features of the invention applied to the complete electric power generating system of a transportation unit;

FIG. 3 is a graph illustrating the electric generator operation with an uncontrolled turbine.

Figure 2:
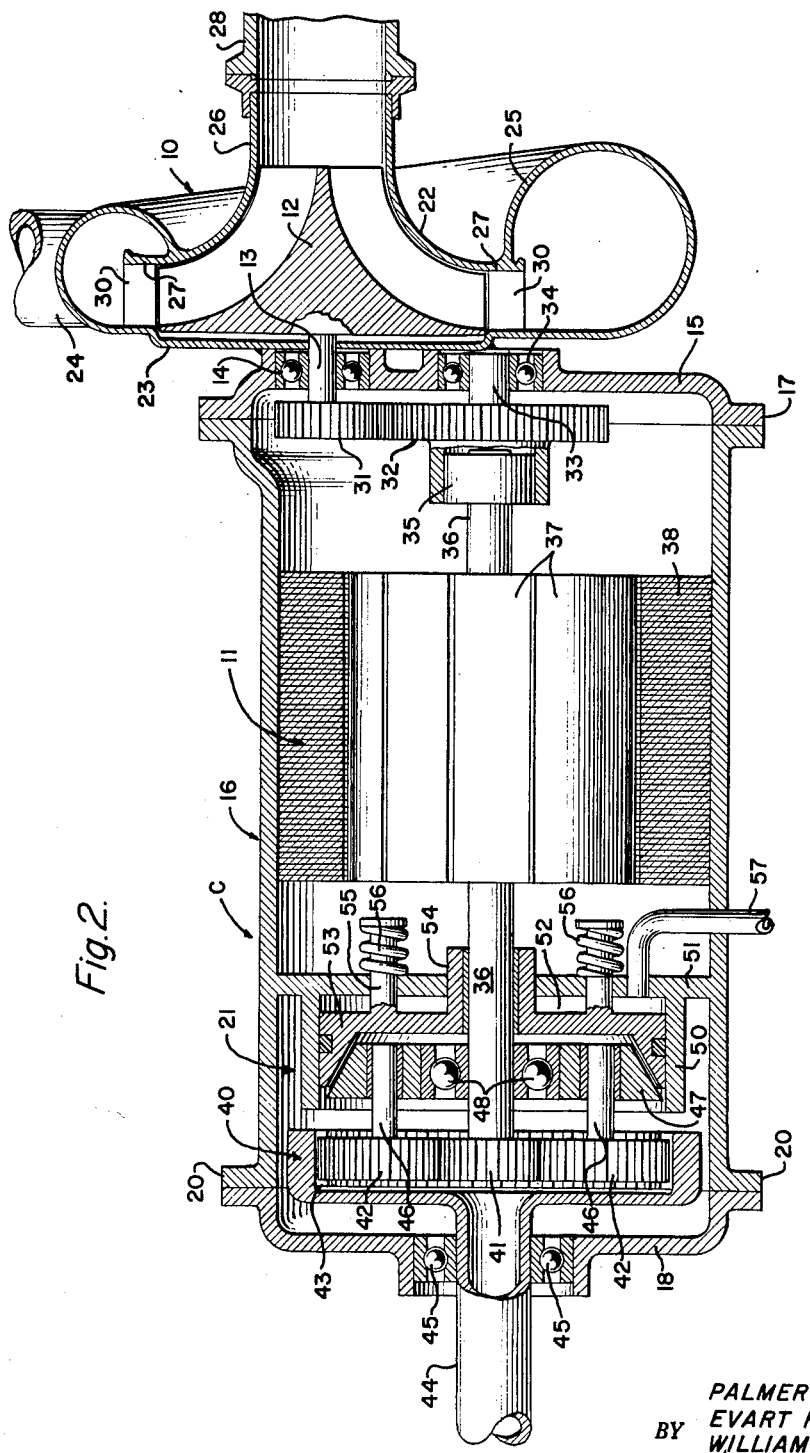
FIG. 2 is a vertical sectional view of the combination gas turbine engine starter and electric power generator shown in FIG. 1.

Referring now to the drawings, and particularly FIG. 1, a combination gas turbine engine starter and power generator C, constructed in accordance with this invention, comprises a suitable air turbine motor 10 which is positioned to drive a generator 11 and also to rotate the shaft of a main gas turbine engine E for starting it. To this end the entire apparatus C is mounted rearward of the engine E and in alignment therewith. One form of the combination starter and generator C is shown in greater detail in FIG. 2 where it will be seen that the air turbine motor 10, in the form shown, includes a wheel 12 having a shaft 13 mounted for rotation in bearings 14 provided in a rearward end wall 15 of a suitable housing 16 for the entire combination starter and generator C. The housing 16, in this instance, consists of a single cylindrical casing having the rear wall 15 attached thereto through flanges 17 and suitable bolts (not shown), and a forward end wall 18 similarly attached thereto through flanges 20 and bolts (not shown). It will be apparent, however, that the main cylindrical body portion of the housing 16 could, if desired for ease of assembly, be made in a plurality of sections to house individual sections of the apparatus, such as the generator 11 and a suitable transmission gearing 21.

The air turbine 10 and wheel 12 thereof are also mounted in a housing 22 which has a forward wall 23 attached to main housing wall 15, and an air supply conduit 24 connected to a substantially annular inlet passage 25 which may be formed of suitable components secured together by welding or other conventional means. Turbine housing 22 also includes a central, axially disposed, tubular portion 26 which merges into a shroud 27 at its inner end and may be connected to a suitable exhaust or discharge conduit 28 at its outer end. Shroud 27 forms part of an inlet nozzle 30 for the turbine. The turbine wheel 12 is of the centripetal type wherein air, from any conventional source, such as another turbine, is supplied through inlet 24 to the wheel, flows radially inwardly, and is then discharged axially through the tubular portion 26 of the housing into the exhaust 28. Such air, in many cases, may be conducted to other locations for further use; but in this instance the design is such that the air has substantially all of the energy removed from it and is exhausted to the atmosphere.

Shaft 13 of the air turbine 10 has a pinion 31 mounted on the end thereof in meshing engagement with corresponding teeth provided on a spur gear 32. This gear is mounted on a stub shaft 33 which rotates in suitable bearings 34 in the end wall 15. The forward side of gear 32 carries a clutch 35, which may be a sprag clutch or any other conventional one-way, overrunning clutch, to effect rotation of a main shaft 36.

It is an important feature of this invention that shaft 36 constitutes the main or primary shaft of the entire combined generator starter C. Thus, said shaft 36, which is the main shaft of the generator 11, has a solid multipole rotor 37, mounted thereon to rotate in cooperative sets of stator laminations 38 which are mounted on the inside of the housing 16. Forward of generator 11, shaft 36 is connected to a suitable planetary or differential gear 40 which includes a sun gear or pinion 41 mounted on the shaft and meshing with planetary wheels or gears 42. These gears in turn mesh with the teeth of a ring gear 43 which is formed on or connected with a shaft 44 connected to the main gas turbine engine shaft and comprising an output-input shaft for the generator depending on the method of operation, as will be more fully explained hereinafter. Shaft 44 is mounted for rotation in bearings 45 provided in the forward end wall 18 of the main housing 16. Planetary gears 42 have shafts 46 which are mounted for rotation in journals provided in a carrier or clutch member 47. The carrier member 47 includes bearings 48 for the shaft 36 and is mounted in an internal cylindrical housing 50 formed in or attached to the inside of the housing 16 through a vertical wall 51. Carrier 47 is spaced from the wall 51 to provide a chamber 52 for receiving a movable clutch or brake member 53, having an annular support or journal 54 surrounding the shaft 36 and provided with guide rods 55. These guide rods extend through openings provided in the wall 51 and are urged in a rearward clutch or brake disengaging direction by helical springs 56 so that movable brake member 53 may slide back and forth along the shaft 36 into and out of engagement with the carrier of the clutch member 47. Clutch member 47 and brake 53 may be used as a fluid operated clutch to effect rotation of shaft 44 through the planetary differential 40, and, for this purpose, may be supplied with an operating fluid through a conduit 57, the conduit 57 connecting the chamber 52 with a suitable control and source of fluid (not shown). It will be understood that when fluid is supplied to the chamber 52, it will move the brake member 53 into engagement with the rotating member 47, causing it to be held stationary and allowing shaft 36, through the gearing 40, to rotate shaft 44 for starting the gas turbine engine, said shaft 44 then functioning as an output shaft.

Although any form of high speed generator may be used in accordance with the principles of this invention, the generator 11 is a homopolar inductor alternator in which the multipole rotor 37 is constructed of high strength steel and rotates in the magnetic field provided by the stator laminations 38. Field excitation is accomplished in any conventional way under the control of an exciter regulator 60, shown schematically in FIG. 1, and connected to the generator through suitable conductors 61. The generator 11 is designed to operate at any speed, as will be explained more fully below, and produce current of the desired frequency by means of a suitable converter 62 and filter 63 which are connected with the generator through conductors 64.

One of the principal features of this invention is to provide an improved combination starter and generator having three methods of operation: first, as an air turbine driven generator for preliminary checking or emergency operation; second, as a starter for a main gas turbine engine; and third, as the main generator driven from the main gas turbine engine. These methods of operation will now be described.

*Preliminary checking*

In this method of operation the main gas turbine engine is not operating and shaft 44 is, therefore, not rotating. In addition, the transmission 21 is in disengaged position with the movable brake 53 moved out of contact with the carrier 47, no fluid pressure being supplied to chamber 52 through the conduit 57. Thus, with the engine input shaft speed at zero, electric power is generated in the generator 11 through pneumatic energy alone supplied through the turbine 10. During such operation bleed air may be supplied to turbine 10 from another turbine or compressor, or air under pressure may be supplied from any conventional outside source. This air rotates the turbine wheel 12 and transmits rotary motion to the multipole rotor 37 through the gears 31 and 32 and sprag clutch 35.

As mentioned above, the use of a high frequency generator coupled with static frequency conversion to the desired output frequency permits the complete elimination of turbine generator speed controls. This is accomplished by utilizing the inherent speed limiting characteristics of the turbine and is one of the features of this invention. In FIG. 3 a characteristic turbine operating curve is shown with turbine speed plotted against turbine output, maximum efficiency occurring at a point substantially midway between zero and runaway speed. It is possible to design a fixed geometry turbine so that, when a given load is applied to the turbine at a time when it is operating at a speed in excess of the speed at which maximum efficiency occurs, the turbine will accelerate or decelerate to the speed at which the turbine output is equal to the given load; that is, a single stable speed condition is obtained for a given set of turbine inlet and exhaust conditions and a given load, and such stable operating speed is a function of the particular load and the inlet and exhaust conditions. At no generator load, the turbine will operate at free-run speed, while the speed corresponding to maximum efficiency will be approached only at conditions of higher load. In FIG. 3, at the point marked "assumed load," the inlet pressure, the discharge pressure, and the inlet temperature are all assumed to be constant.

As an example, consider a generator which may be operated at any speed from 24,000 to 60,000 r.p.m. Since the frequency converter 62 maintains a constant frequency output, regardless of input frequency, it will be understood that the output is independent of the shaft input speed. As a result of this fact, the generator may be driven with no speed trim and the turbine may be operated with no control system other than the usual pressure regulating and shutoff valve.

It will also be apparent from FIG. 3 that the output horsepower from the turbine is zero at zero speed and reaches a maximum at some midpoint of speed, and is again zero at runaway. For this application, the gear ratio in gears 31 and 32 between the turbine and generator, the turbine size, and the pressure setting on the inlet valve are selected so that operation is from a speed past peak horsepower to runaway speed. At no load the turbine will operate at or near runaway and as the load on the generator is increased, the turbine speed will decrease with the accompanying increase in turbine output horsepower. It is for this reason that the speed control system may be eliminated.

*Engine starting*

During this method of operation when it is desired to start the main gas turbine engine, the brake 53 is engaged by supplying fluid pressure to chamber 52 through conduit 57 so as to move said brake 53 into contact with the carrier member 47. Air under pressure, as in the operation for preliminary checking, is supplied to the turbine 10 from a suitable source (not shown) through conduit 24 so as to rotate shaft 36, and through the planetary gears 40, with the brake 53 engaged, engine shaft 44 will be rotated as an output shaft. During this type of operation, the generator 11 functions only as a means of mechanically transmitting power through the shaft 36, from the turbine 10 and clutch 35, through the planetary gears 40 to the output shaft, and thence to the engine. When the engine ultimately starts, the air source to the turbine will be interrupted at a selected predetermined speed, allowing the turbine 10 to become inoperative. With the reversal of torque then resulting at clutch 35, the clutch will disengage, thus permitting the turbine to come to rest.

*Power generating*

In normal operation of the transportation unit in which the invention is included, the principal power to operate the generator will be from the main gas turbine engine which is started in operation as just described. Therefore, brake 53 is maintained in its operative engaged position so that power from the engine and shaft 44 is transmitted to the generator 11, shaft 44 thus operating as an input shaft. Since the engine speed will vary, the generator speed will not be held constant but will be a function of the engine shaft speed and allowed to vary over the complete operating range. The major portion of the variable high frequency output of the generator is passed through the static converter 62, which contains rectifiers and pulse triggering devices, so that the variable input frequency may be fabricated into the desired output power. It will be understood that suitable electrical devices may be included to provide any desired output and that the output may be in direct current, if desired.

We claim:

1. A combination starter and generator for use with a gas turbine engine comprising: a main shaft; an output shaft; electric current generating means having a part mounted on said main shaft; an air turbine motor; means for connecting said air turbine motor to said main shaft to cause said air turbine motor to drive said main shaft and said electric current generating means; gear means adapted in a first condition of operation to establish a driving connection between said main shaft and said output shaft and in a second condition of operation to interrupt such driving connection; and means for selecting the condition of operation of said gear means whereby said air turbine motor may be used to drive said main shaft to operate said current generating means for preliminary checking or to drive said gear means for turning said output shaft in a gas turbine starting function, said gear means also serving in said first condition of operation to transmit rotary motion from said output shaft to said main shaft and said electric current generating means.

2. A combination starter and generator for use with a gas turbine engine comprising: a main shaft; an output shaft; electric current generating means having a part mounted on said main shaft; an air turbine motor; means for connecting said air turbine to said main shaft for driving said shaft; planetary gear means including a sun gear mounted on said main shaft, a ring gear mounted on said output shaft, a rotatable carrier, and planet gears mounted on said carrier for meshing engagement with said sun gear and said ring gear; and means for holding said rotatable carrier against rotation so as to cause said main shaft to rotate said output engine shaft.

3. A combination starter and generator for use with a gas turbine engine comprising: a main shaft; a second shaft which is adapted to function both as an output and as an input shaft; electric current generating means having a part mounted on said main shaft; an air turbine motor; means for connecting said air turbine to said main shaft for driving said shaft; planetary gear means including a sun gear mounted on said main shaft, a ring gear mounted on said second shaft, a rotatable carrier, and planet gears mounted on said carrier for meshing engagement with said sun gear and said ring gear; means for holding said rotatable carrier against rotation so as to cause said main shaft to rotate said second shaft as an output shaft; and means for actuating such holding means during periods for starting and operating the gas turbine engine, whereby said main shaft may be used both for starting the engine when said second shaft functions as an output shaft and for operating said electric current generating means when said second shaft functions as an input shaft for said electric current generating means.

4. A combination starter and generator for use with a gas turbine engine comprising: a main shaft; an output shaft adapted to be connected to said gas turbine engine; electric current generating means having a part mounted on said main shaft; an air turbine motor; means for connecting said air turbine to said main shaft for driving said shaft; planetary gear means including a sun gear mounted on said main shaft, a ring gear mounted on said output shaft, a rotatable carrier, and planet gears mounted on said carrier for meshing engagement with said sun gear and said ring gear; means for holding said rotatable carrier against rotation so as to cause said main shaft to rotate said output shaft; and means for actuating such holding means during periods for starting and operating the gas turbine engine and for allowing the rotatable carrier to rotate during periods when the air turbine is driving the main shaft for preliminary checking or emergency operation of the electric current generating means.

5. A combination starter and generator for use with a gas turbine engine comprising: a main shaft; an output shaft adapted to be connected to said engine; electric current generating means having a part mounted on said main shaft; an air turbine motor; means for connecting said air turbine to said main shaft for driving said shaft; planetary gear means including a sun gear mounted on said main shaft, a ring gear mounted on said output shaft, a rotatable carrier, and planet gears mounted on said carrier for meshing engagement with said sun gear and said ring gear; means for holding said rotatable carrier against rotation so as to cause said main shaft to rotate said output shaft; and fluid pressure operated means for actuating such holding means during periods for starting and operating the gas turbine engine and for allowing the rotatable carrier to rotate during periods when the air turbine is driving the main shaft for preliminary checking of the electric current generating means.

6. A combination starter and generator for use with a gas turbine engine, comprising: a housing; a main shaft mounted for rotation in said housing; electric generating means including a rotor mounted on said main shaft in operative association with a stator in said housing; gear means at one end of said main shaft for operatively connecting said shaft to the gas turbine engine; an air turbine; and means at the other end of said main shaft for connecting said air turbine to said shaft, whereby said electric generating means may serve as a speed control for said air turbine and said main shaft may be used to rotate said gear means for starting the gas turbine engine.

7. A combination starter and generator for use with a gas turbine engine, comprising: a housing; a main shaft mounted for rotation in said housing; means for rotating said main shaft; electric generating means in said housing and including an homopolar rotor mounted on said main shaft in operative association with a stator mounted in said housing; an output shaft mounted in said housing and adapted to be connected to said gas turbine engine; gear means for operatively connecting said main shaft and said output shaft; means for operating said gear means so as to cause said main shaft to rotate said output shaft for starting said gas turbine; and means for disconnecting said rotating means from the main shaft when said main shaft reaches a predetermined speed of rotation.

8. A combination starter and generator for use with a gas turbine engine, comprising: a housing; a main shaft supported for rotation in said housing; fluid pressure operated means for rotating said main shaft; electric power generating means in said housing having a rotor mounted on said main shaft in operative association with a stator mounted in said housing; an output shaft mounted in said housing and adapted to be connected to a gas turbine engine; means for selectively establishing and interrupting a motion-transmitting connection between said main and output shafts; and means for preventing the transmission of rotary motion from said main shaft to said fluid pressure operated means.

9. A combination starter and generator for use with a gas turbine engine, comprising: a housing; a main shaft supported for rotation in said housing; fluid pressure operated rotary motion producing means carried by said housing; a one-way clutch for transmitting rotary power from said fluid pressure operated means to said main shaft and preventing the transmission of power in the reverse direction; electric power generating means in said housing having a rotor mounted on said main shaft in operative association with a stator mounted in said housing; a combination output and input shaft mounted in said housing and adapted to be connected to a gas turbine engine; and means for selectively establishing and interrupting a motion-transmitting connection between said main and output shafts.

10. A combination starter and generator for use with a gas turbine engine, comprising: a housing; a main shaft supported for rotation in said housing; fluid pressure operated rotary motion producing means carried by said housing; a one-way clutch for transmitting rotary power from said fluid pressure operated means to said main shaft and preventing the transmission of power in the reverse direction; electric power generating means in said housing having a rotor mounted on said main shaft in operative association with a stator mounted in said housing; a combination output and input shaft mounted in said housing and adapted to be connected to a gas turbine engine; means operative in a first condition to establish a motion-transmitting connection between said main and output shafts and to interrupt said motion-transmitting connection in a second condition; and fluid pressure operated means for selecting the condition of operation of said last-named means.

References Cited by the Examiner

UNITED STATES PATENTS

| | | | |
|---|---|---|---|
| 1,101,618 | 6/14 | Dake | 290—52 |
| 2,171,346 | 8/39 | Rosch | 290—4 |
| 2,281,987 | 5/42 | Oswald | 290—40 |
| 2,509,731 | 5/50 | Edwards et al. | 290—40 |
| 2,776,379 | 1/57 | Sargeant | 321—61 |
| 2,920,211 | 1/60 | Gotoh | 290—4 X |
| 2,949,731 | 8/60 | Hambling | 290—4 X |

ORIS L. RADER, *Primary Examiner.*

MILTON O. HIRSHFIELD, *Examiner.*